May 24, 1955 J. H. DAVIDS 2,708,916
FUEL CONTROL SYSTEM FOR INTERNAL COMBUSTION ENGINES
Filed Nov. 22, 1952 2 Sheets-Sheet 1
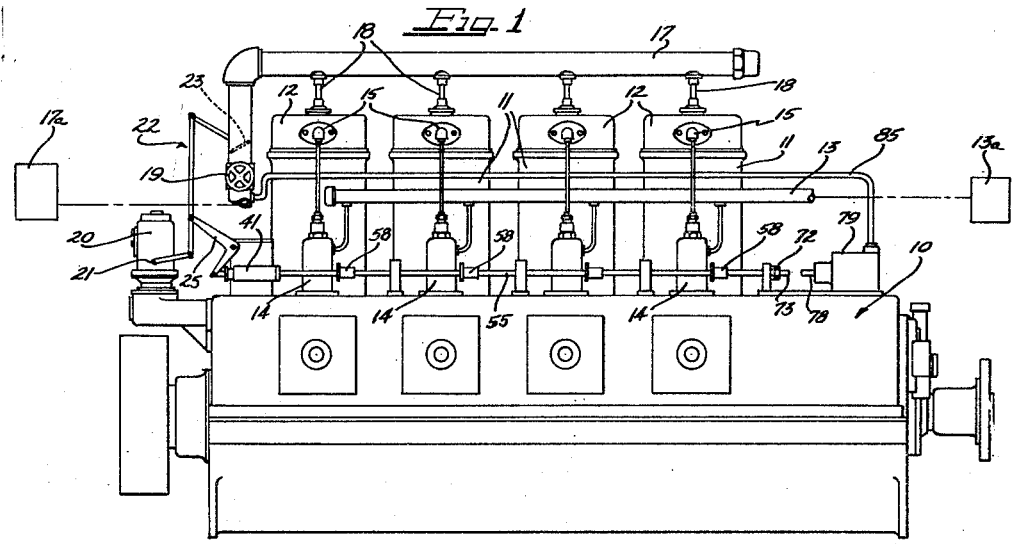
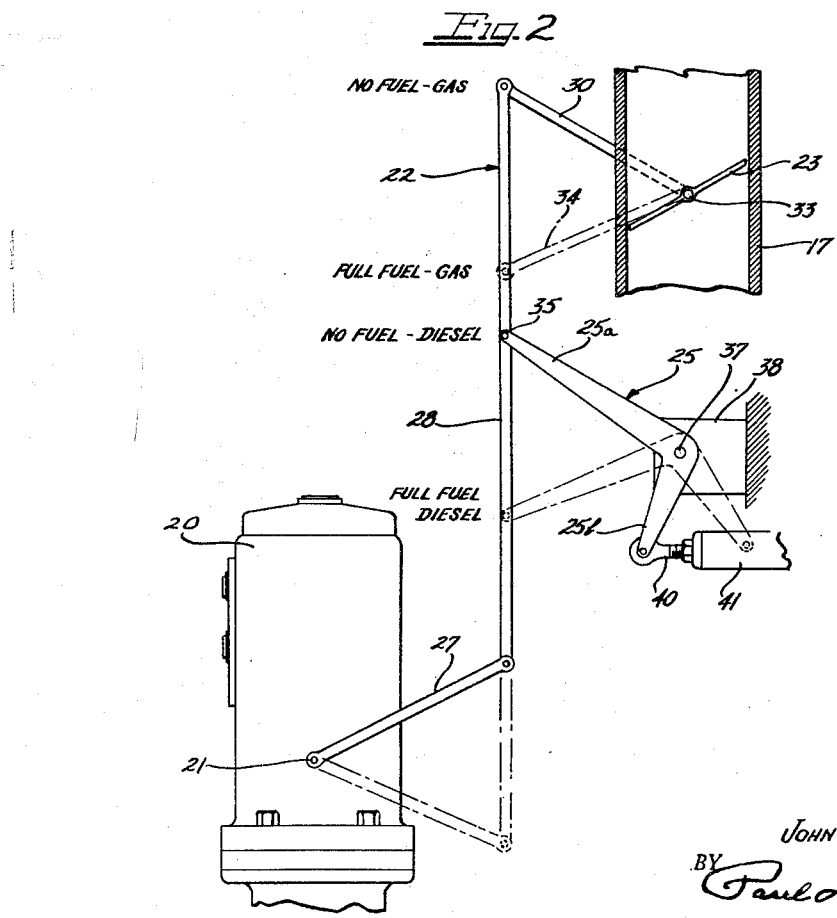
INVENTOR.
JOHN HANS DAVIDS
BY
Paul L. Keehn
ATTY.

May 24, 1955  J. H. DAVIDS  2,708,916
FUEL CONTROL SYSTEM FOR INTERNAL COMBUSTION ENGINES
Filed Nov. 22, 1952  2 Sheets-Sheet 2
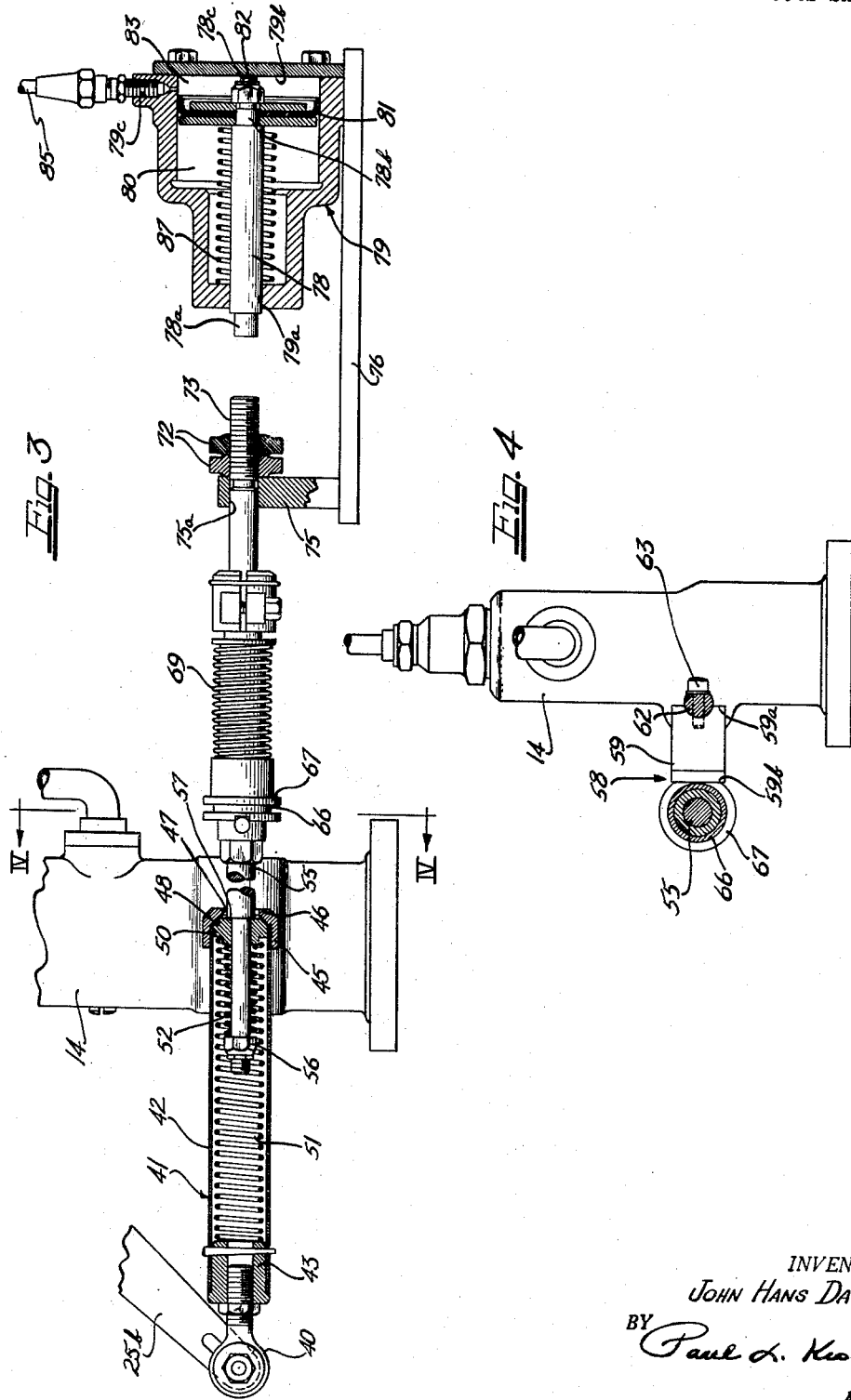
INVENTOR.
JOHN HANS DAVIDS
BY
Paul L. Kraher
ATTY.

United States Patent Office 2,708,916
Patented May 24, 1955

2,708,916

FUEL CONTROL SYSTEM FOR INTERNAL COMBUSTION ENGINES

John Hans Davids, Beloit, Wis., assignor to Fairbanks, Morse & Co., Chicago, Ill., a corporation of Illinois Application November 22, 1952, Serial No. 322,066

13 Claims. (Cl. 123—27)

This invention relates to improvements in fuel systems for internal combustion engines. More particularly, it has to do with an improved fuel control system for a dual fuel engine, wherein means is provided for regulating engine operation on liquid fuel alone, or on gaseous fuel with ignition thereof effected by liquid fuel in pilot quantity, and wherein the system is effective for automatically determining liquid or gaseous fuel operation of the engine in dependence upon conditions of gas fuel supply to the engine.

In internal combustion engines which are designed to burn either of two different fuels in the cylinders, it is necessary that governing means be provided for controlling the feeding of the selected fuel to the engine over the full load and speed range. Heretofore, a governor has been employed on dual fuel engines which uses half of its travel for controlling the feeding of one fuel and the other half for controlling the delivery of the other fuel. In general, such an arrangement results in a relatively insensitive and inaccurate, over-all governing action.

It is, therefore, an important object of the present invention to provide a governor-regulated fuel control system for a dual fuel engine in which the full travel or control range of the governor is exploited for fuel regulation with the engine operating on liquid fuel as a diesel, or on gaseous fuel with pilot ignition.

Another object of the present invention is the provision of a control system for the fuel system of a dual fuel engine, which will automatically switch the engine to diesel fuel operation in the event the gas fuel supply fails or the pressure in the gas supply line drops below a predetermined minimum value.

According to the general features of the present invention, a fuel control system is provided for a dual fuel engine which is adapted for operation on either a gaseous fuel or a liquid, diesel fuel. An engine speed governor is arranged to regulate simultaneously, the positions of a slidable rod that actuates the control racks of the diesel fuel pumps, and the setting of a throttle valve that controls the flow of gaseous fuel through the engine gas fuel manifold. A control unit, that is sensitive to the pressure in the gas manifold, prevents the actuation of the diesel fuel pump control racks when gaseous fuel under proper pressure is available in the gas manifold, and permits actuation of the racks when there is no gaseous fuel in the manifold or the pressure of the gas therein has dropped below a predetermined minimum. A lost-motion connection in the fuel rack control rod provision permits governor movement of the rod in the event one or more of the racks become locked. Thus, while the full travel or control range of the governor is employed to simultaneously regulate the gas valve and the fuel pump racks, only one of the two fuel control means is in operative condition to respond to the governor regulatory movements.

Other and further features, objects, and advantages of the present invention will be apparent to one skilled in the art from the following detailed description taken in connection with the accompanying drawings.

On the drawings:

Fig. 1 is a more or less schematic side elevational view of a dual fuel engine embodying a fuel control system constructed in accordance with the teaching of the present invention.

Fig. 2 is an enlarged schematic showing of the governor control linkage portion of the fuel control system of Fig. 1.

Fig. 3 is an enlarged fragmentary side elevational view of the fuel control system of Fig. 1, with parts broken away and parts in section to more clearly disclose the component parts of the system.

Fig. 4 is a vertical sectional view taken on line 4—4 of Fig. 3.

As shown on the drawings:

In Fig. 1 the reference numeral 10 indicates generally, an internal combustion engine having a plurality of cylinders 11 with cylinder heads 12. A piston (not shown) is mounted for reciprocation in each cylinder in the usual manner. Diesel fuel, delivered to a fuel conduit or manifold 13 from a suitable source 13a, is supplied from the manifold to each cylinder by means of a fuel pump 14 and an injector nozzle 15. Gaseous fuel at a predetermined desired supply pressure is delivered to the combustion chamber of each cylinder from a gas fuel supply conduit or manifold 17, by means of a suitable conduit 18 and an engine timed gas control valve (not shown) in the cylinder head. Supply and shut-off of gaseous fuel relative to the manifold 17, may be controlled by a main valve 19 in the manifold on the gas supply side of the governor controlled gas throttle hereinafter to be described. As shown, the manifold 17 receives gaseous fuel from a suitable source 17a.

A conventional single range speed governor 20 is mounted on the engine and has a control shaft 21 that is connected through a linkage 22 to a gas throttle valve 23 in the gas manifold 17 to control the flow of gaseous fuel, and to a bellcrank 25 that is operatively connected to the control racks of the diesel fuel pumps 14. As best seen in Fig. 2, the linkage 22 consists of an arm 27 keyed or splined to the control shaft 21, and a vertically movable rod 28 pivotally connected at one end to the arm 27 and at the other end to a valve control arm 30. The valve 23, which may be of any suitable type and is herein illustrated as a butterfly type valve, is disposed in the manifold 17 to control the flow of gas therethrough. This valve may be keyed to a shaft 33 which is rotatably mounted in the walls of the manifold and which is keyed exteriorly of the manifold to the end of the valve control arm 30. Pivotal movement of the arm 30 in response to governor travel between the "No Fuel-Gas" position shown in heavy lines and the "Full Fuel-Gas" position, as indicated by the dotted line showing thereof at 34, will effect movement of the valve 31 from full closed to full open position.

The governor control rod 28 controls the adjusted position of the diesel fuel pump control racks through a pivotal connection 35, intermediate its ends, to the end of one arm 25a of the bellcrank 25 which is mounted for pivoting on a pin 37 attached to a suitable stationary engine part 38. The other arm 25b of the bellcrank 25 is pivotally connected to an eye-bolt 40 that is threaded into the end of a hollow tubular housing member 41.

In Fig. 3 it will be seen that the housing member 41 comprises a tubular body 42 which is closed at one end by a rigidly attached plug 43 into which the eye-bolt 40 is threaded. At the other end, a cap 45 is secured over the body portion 42, said cap having a transversely extending wall 46 with a central opening 47 which provides an internal, annular, slanted face 48 against which a movable collar 50 abuts under the urging of a pair of coil springs 51 and 52. The spring 51 is disposed inside the housing 41 between the plug 43 and the collar 50, normally urging the collar against the abutment surface 48 and thus transmitting the movement of the plug 43 to the collar 50. The spring 52 is disposed around a fuel rack control rod 55 that projects through the opening 47, the spring being compressed between the collar 50 and a nut 56 threaded on the end of the rod 55. The spring 52 draws the rod 55 into the housing 41 and presses a shoulder 57, formed on the rod 55, into contact with the collar 50. Thus movement of the eye-bolt 40, in response to governor movement, is transmitted to the rack control rod 55 through the plug 43, the spring 51, the collar 50, and the shoulder 57.

As seen in Fig. 1, the fuel rack control rod 55 extends along the engine adjacent the fuel pumps 14, to each of which it is connected by a resilient connection 58. It will be evident that the rod 55 may be varied in length in accordance with the number of fuel pumps on the engine. Each resilient connections 58, Fig. 4, comprises an arm 59 extending in a direction laterally of the rod 55, being secured at one edge 59a to the fuel pump rack 62 in any suitable manner, as by a setscrew 63. An opposite edge 59b of the arm 59 extends into a groove 66 in a collar 67 of a resilient drive connection 69. This drive connection 69 may be of any well-known type which provides for the positive adjusting movement of the control rack by the rod 55 during normal operation of the pumps and permits free movement of the rod 55 in a fuel decreasing direction even though one or more of the control racks become jammed or locked during operation.

When the dual fuel engine is operating on gaseous fuel, it is necessary according to the present pilot ignition example, that a predetermined small amount of diesel oil be injected into the cylinder to initiate combustion of the gaseous fuel therein. Thus, it is necessary that the diesel fuel control racks have a fixed minimum setting to provide for pilot fuel injection. In the present invention this minimum or initial setting is obtained by threading lock nuts 72 on the threaded end 73 of the rod 55 which extends freely through an opening 75a in a support member 75 that is suitably mounted in a stationary position on an engine part 76. In Figs. 1 and 2, movement of the control 55 to the right causes the fuel pump racks 62 to be moved to increase the quantity of fuel delivered by each pump. Movement of the rod 55 to the left causes a decrease in the quantity of fuel delivered. The lock nuts 72 will limit the movement of the rod toward the left and thereby will assure the desired minimum fuel delivery setting of the fuel pumps to deliver a pilot quantity of fuel for ignition of the gas mixture. It will be readily appreciated that the amount of pilot fuel can be varied by threading the nuts 72 further on or off the rod 55.

It is desirable that a dual fuel engine be operated on the cheaper gaseous fuel when it is available. In a fuel control system for this type of engine, provision must be made for locking the fuel pumps in a fixed position, as in the indicated pilot injection position, during operation of the engine on gas. In the present invention this locking of the fuel pumps is effected through a plunger 78 that is disposed in a control housing 79 and has an end portion 78a projecting through an opening 79a in the housing 79, in alignment with the control rod 55 and relatively adjacent the end 73 of the rod. The housing 79, which may be mounted on the engine part 76, has a hollow interior defining a substantially cylindrical chamber 80 in which a piston 81 is slidably disposed. A reduced end portion 78b of the plunger 78 passes through the center of the piston 81 and is secured therein by a nut 82. The extreme end 78c of the plunger 78 projects through the nut 82 for abutment with the end wall 79b of the housing 79 to limit the movement of the piston 81 to the right in the chamber 80, and thereby define a pressure chamber 83 between the piston and the end wall 79b.

A conduit 85 is secured in an opening 79c in the housing wall, which opening is in communication with the pressure chamber 83. As seen in Fig. 1, the conduit 85 is also connected into the gaseous fuel manifold 17. Since the conduit 85 establishes a fluid flow communication between the gas manifold 17 and the pressure chamber 83, the piston 81 will be acted on by the pressure of the gas in the manifold tending to move the end 78a of the plunger 78 to the left as seen in Fig. 3. The travel of the piston 81 in the chamber 80 is such that the end 78a will move into abutting contact with the end 73 of the control rod. As long as there is gas under the predetermined desired supply pressure in the manifold 17, which supply pressure may be for example, in the range of 30 to 40 pounds, the plunger 78 will be held in this extended position, restricting the movement of the rod 55 and thus preventing movement of the diesel fuel control racks to increase the feed of the diesel fuel. It will be evident that, even though the control racks cannot be moved, the fuel pumps will deliver a pilot quantity of fuel due to the original position of the nuts 72.

When the supply of gaseous fuel ceases for any reason, or is shut-off at valve 19, and the pressure in the pressure chamber 83 drops to and below a predetermined minimum value, say below 30 pounds, a spring 87 disposed inside the control housing 79 between the piston 81 and the wall of the housing 79, moves the piston back to its initial position at the right hand end of the chamber 80, as seen in Fig. 2, thus clearing the rod end 73 such as to permit pump rack control in the fuel increasing direction.

A special feature of this invention resides in the provision of means for permitting the governor control linkage 22 to operate even though the diesel fuel control rod 55, to which it is connected, is locked against movement. Referring to Fig. 2 it will be recalled that movement of the eye-bolt 40, in response to governor travel, is transmitted to the rack control rod 55 through the plug 43, the spring 51, the collar 50, and the shoulder 57 of the rod 55. If the rod 55 is locked against movement, as by the plunger 78 in engagement with rod end 73, the spring 51 will compress, permitting full movement of the eye-bolt 40. It will be appreciated that the spring 51 must be designed to be rigid enough to transmit governor movements to the fuel pump control racks during diesel operation, and to be compressible during gas operation when the pressure of the gas in the pressure chamber 83 holds plunger 78 in position to prevent movement of the fuel control racks in the liquid fuel increasing direction.

When an engine, which has a fuel system constructed according to the present invention, is put into operation on gas fuel, the plunger 78 is pushed out of the housing 79 by gas pressure into abutting position against the end 73 of the rod 55. The diesel fuel control racks, which are adjusted for injecting only pilot quantities of oil into the engine, are then held against movement, by the plunger 78 in engagement with rod 55. When the supply of gas fails for any reason or is cut-off at valve 19, the spring 87 retracts the plunger 78 into the housing 79, thus freeing the diesel oil control racks for movement in response to control movements of the speed governor. The change-over from gas fuel to oil fuel, or vice versa, is made automatically in response to the presence and absence of gas fuel under pressure in the manifold 17, which determines respectively, locking and unlocking of the diesel fuel control racks as herein described. There is thus provided in this invention, a novel fuel control system that makes possible the continuous operation of a dual fuel engine with little or no supervision in regard to the control change-over for engine operation on either fuel.

It will be understood that modifications and variations may be effected without departing from the scope of the novel concepts of the present invention.

What is claimed is:

1. In a fuel control system for an engine adapted for operation selectively on a gaseous fuel and on a liquid fuel, the combination of a manifold for gaseous fuel under pressure, valve means controlling the flow of gaseous fuel from said manifold to the engine, a conduit for liquid fuel supply to the engine, pumping means for delivering liquid fuel from said conduit to the engine, means for adjusting the fuel discharge setting of said pumping means, a governor responsive to changes in engine speed and operatively connected to said valve means, a linkage connecting said governor and said pump adjusting means, a control member having a pressure chamber sensitive to the pressure of gaseous fuel in said manifold, a piston in said chamber, and an abutment member connected to said piston for movement therewith and having a portion projecting exteriorly of said chamber, said projecting portion being movable into the path of movement of said linkage such as to prevent movement of the linkage in a fuel-increasing direction when the pressure in the chamber reaches a predetermined minimum value.

2. In an internal combustion engine adapted for operation selectively on a liquid fuel and on a gaseous fuel with ignition thereof by a pilot quantity of liquid fuel, a supply conduit for gaseous fuel delivery to the engine, a throttle valve in said conduit, a variable discharge pump for liquid fuel delivery to the engine, the pump having a control member movable for varying the pump discharge, an operating element connected to said control member nad effective in one position for determining an initial control position of the member conditioning the pump for liquid fuel discharge to the engine in predetermined pilot quantity, engine speed responsive control means in operating connection to said throttle valve, a yieldable operating connection between said control means and said element for actuation of the latter to effect pump fuel discharge varying movement of said control member, and means effective in response to gaseous fuel supply in said conduit for positioning and retaining said operating element in its said one position, said yieldable operating connection then yielding in the operation of said control means to operate said throttle valve.

3. In combination in a fuel control system for an engine adapted for operation selectively on a gaseous fuel and on a liquid fuel, a manifold for gaseous fuel supply to the engine, a manifold for liquid fuel supply to the engine, a valve disposed in said gas manifold controlling the flow of gaseous fuel therethrough, variable discharge pumping means connecting said liquid fuel manifold to the engine, means for adjusting the fuel discharge setting of said pumping means, a governor responsive to changes in engine speed and having a control arm movable through a fixed angular control range, a rod actuated by said control arm, a first linkage connecting said rod to said valve for opening and closing the same in response to movement of said governor control arm, a second linkage connecting said rod and said pump adjusting means for varying the amount of liquid fuel discharged in response to movements of the governor control arm, a pressure responsive control member sensitive to the pressure of gaseous fuel in said gas manifold, and an abutment member associated with said control member and movable into the path of movement of said second linkage to restrict movement of said pump adjusting means in response to an increase of pressure in said pressure responsive control member, said second linkage having a lost motion connection permitting full movement of said governor control arm when movement of said pump adjusting means is restricted by said control member.

4. In combination in a fuel control system for an internal combustion engine adapted for operation selectively on gaseous fuel and on liquid fuel, means providing a supply of gaseous fuel, means providing a supply of liquid fuel, separate conduit means connecting each supply means in fuel delivery association with the engine, a separate control means associated with each conduit means for regulating the quantity of fuel delivered to the engine through the associated conduit means, an engine speed responsive governor having a control arm movable through a fixed range, an operating connection between said control arm and said separate control means for simultaneous operation of the latter in response to governor movement of said control arm in said range thereof, and means responsive to gaseous fuel in the conduit means connecting the gaseous fuel supply means in fuel delivery association with the engine, for rendering inoperative said operating connection between the governor control arm and the control means regulating liquid fuel quantity delivery to the engine.

5. In combination in a fuel control system for an engine adapted for operation selectively on a gaseous fuel and on a liquid fuel, a manifold for gaseous fuel supply to the engine, a manifold for liquid fuel supply to the engine, a valve controlling the flow of gaseous fuel through the gas manifold, variable discharge pumping means connecting said liquid fuel manifold to the engine, means for adjusting the fuel discharge setting of said pumping means, a governor responsive to changes in engine speed and having a control arm movable through a fixed control range, a rod actuated by said control arm, a linkage connecting said rod to said pump adjusting means, a linkage connecting said rod to said valve for opening and closing the same, movement of said governor control arm through its entire range being effective to simultaneously adjust the fuel delivery characteristics of said valve means and said variable pumping means, and means responsive to the pressure of gaseous fuel in said gas manifold to render the linkage between said rod and said pump adjusting means ineffective for varying the quantity of liquid fuel discharged by said pumping means.

6. In an internal combustion engine adapted for operation selectively on a gaseous fuel and a liquid fuel, a supply conduit for gaseous fuel delivery to the engine, a throttle valve in said conduit, a variable discharge pump for liquid fuel delivery to the engine, the pump having a member operable for effecting variations of pump discharge, engine speed responsive control means for operating said throttle valve, an operating connection between said control means and said member for operation of the member to effect pump discharge variations, and means responsive to gaseous fuel in the conduit for rendering said operating connection ineffective to operate said member.

7. In combination in a fuel control system for an engine adapted for operation selectively on a gaseous fuel and on a liquid fuel, a manifold for gaseous fuel supply to the engine, a manifold for liquid fuel supply to the engine, a valve controlling the flow of gaseous fuel through said gas manifold, variable discharge pumping means connecting said liquid fuel conduit to the engine, means for adjusting the fuel discharge setting of the pumping means, a governor sensitive to engine speed and having a control arm movable through a fixed control range, said control arm being operatively connected to said valve and to said pump adjusting means to simultaneously actuate both said valve and said adjusting means as said control arm moves through its entire control range, and means responsive to the presence of gaseous fuel in said gas manifold to render ineffective the connection between said pump adjusting means and said governor control arm.

8. In an internal combustion engine adapted for operation selectively on a gaseous fuel and a liquid fuel, a supply conduit for gaseous fuel delivery to the engine, a throttle valve in said conduit, a variable discharge pump for liquid fuel delivery to the engine, the pump having a member operable for effecting variation of pump discharge, engine speed responsive control means in operating connection to said throttle valve and including yieldable means in operating connection to said pump discharge varying member, and means effective in response to gaseous fuel supply in said conduit for causing said yieldable means to yield in the operation of the control means, such that the yieldable means is then ineffective to operate said member.

9. In combination in a fuel control system for an engine adapted to burn either a gas fuel or a liquid fuel, a manifold for gas fuel, a manifold for liquid fuel, separate means connecting each manifold to the combustion chamber of the engine, a separate adjusting means associated with each connecting means for varying the quantity of each fuel delivered to the engine through the associated connecting means, a governor responsive to changes in engine speed and having a control arm movable through a fixed range, said control arm being operatively connected to both of said adjusting means to simultaneously actuate the same as said control arm moves through its entire control range, and means responsive to the presence of gas in said gas manifold to render ineffective the actuating connection between said governor control arm and said liquid fuel adjusting means.

10. In a fuel control system for an engine adapted for operation selectively on a gaseous fuel and on a liquid fuel, the combination of, a manifold for gaseous fuel supply ot the engine, valve means in said gas manifold for controlling the flow of gaseous fuel therethrough, variable-delivery pump means for supplying liquid fuel to the engine in quantity according to the delivery setting of the pump means, a linkage actuatable for determining the fuel delivery setting of said pump means between a predetermined minimum fuel delivery setting and maximum fuel delivery setting, a governor responsive to changes in engine speed and connected to said valve means and to said linkage for simultaneously actuating said valve means and the linkage, and means operatively associated with said linkage and effective in response to gaseous fuel under pressure in said gas manifold, to render said linkage ineffective to change the delivery setting of said pump means from its minimum fuel delivery setting.

11. In a fuel control system for an engine adapted for operation selectively on a gaseous fuel and on a liquid fuel, the combination of, a manifold for gaseous fuel supply to the engine, valve means in said manifold for controlling the flow of gaseous fuel therethrough, variable delivery pump means arranged to supply liquid fuel to the engine, a control rod connected to said pump means to vary the pump discharge characteristics of said pump means, adjustable means limiting the movement of said control rod in a fuel decreasing direction to a minimum discharge setting, a linkage cinnected to said control rod to move said rod between said minimum discharge setting and full liquid fuel discharge, a governor responsive to changes in the speed of the engine and connected to said valve means and to said linkage for simultaneously actuating said valve means and said linkage, holding means operable in response to the presence of gaseous fuel in said manifold during gaseous fuel operation of the engine, for positioning and holding said control rod in its said minimum discharge setting, and a lost motion connection between said linkage and said control rod permitting governor actuation of said linkage when said control rod is held against movement from its said minimum discharge setting by said holding means.

12. In an internal combustion engine adapted for operation selectively on a gaseous fuel and on a liquid fuel, a supply conduit for gaseous fuel delivery to the engine, variable discharge pump means for liquid fuel delivery to the engine, control means for varying the discharge of said pump means, and means responsive to the presence of gaseous fuel in said conduit for rendering said control means ineffective to vary the discharge of said pump means.

13. In an internal combustion engine adapted for operation selectively on a gaseous fuel and on a liquid fuel, a supply conduit for gaseous fuel delivery to the engine, a throttle valve in said conduit, variable discharge pump means for liquid fuel delivery to the engine, engine speed responsive control means for operating said throttle valve and varying the discharge of said pump means, and means responsive to gaseous fuel in said conduit for preventing pump discharge variations by said control means.

References Cited in the file of this patent

UNITED STATES PATENTS

| | | |
|---|---|---|
| 2,400,219 | Barnaby et al. | May 14, 1946 |
| 2,400,247 | Miller et al. | May 14, 1946 |

FOREIGN PATENTS

| | | |
|---|---|---|
| 530,358 | Great Britain | Dec. 10, 1942 |
| 877,398 | France | Sept. 7, 1942 |
| 877,768 | France | Sept. 14, 1942 |